United States Patent
Bruck et al.

(10) Patent No.: US 6,439,257 B1
(45) Date of Patent: Aug. 27, 2002

(54) PRESSURE CONTROL VALVE WITH HYDRODYNAMIC DAMPING

(75) Inventors: Peter Bruck, Zweibrucken; Thorsten Hillesheim, Saarbrucken, both of (DE)

(73) Assignee: Hydac Fluidtechnik GmbH (DE)

( * ) Notice: Subject to any disclaimer, the term of this patent is extended or adjusted under 35 U.S.C. 154(b) by 0 days.

(21) Appl. No.: 09/720,670

(22) PCT Filed: Mar. 6, 1999

(86) PCT No.: PCT/EP99/01453

§ 371 (c)(1),
(2), (4) Date: Feb. 26, 2001

(87) PCT Pub. No.: WO00/02109

PCT Pub. Date: Jan. 13, 2000

(30) Foreign Application Priority Data

Jul. 1, 1998 (DE) .......................... 198 29 394

(51) Int. Cl.[7] .............................. G05D 16/02
(52) U.S. Cl. .................. 137/102; 137/454.5; 251/50
(58) Field of Search .............. 137/115.15, 102, 137/107, 454.5; 251/50, 53

(56) References Cited

U.S. PATENT DOCUMENTS

| | | | | |
|---|---|---|---|---|
| 2,103,299 A | * | 12/1937 | Ravnsbeck ............. | 137/115.15 |
| 2,561,431 A | * | 7/1951 | Towler et al. ......... | 137/115.15 |
| 3,885,583 A | * | 5/1975 | Tennis ................... | 137/115.15 |
| 3,916,933 A | * | 11/1975 | Boehringer et al. ........ | 137/102 |
| 3,945,399 A | | 3/1976 | Tirelli ........................ | 137/529 |
| 4,444,216 A | * | 4/1984 | Loup .................... | 137/115.15 |
| 5,050,636 A | | 9/1991 | Sagawa et al. ............. | 137/494 |

FOREIGN PATENT DOCUMENTS

| FR | 2 394 846 | 1/1979 |
|---|---|---|
| FR | 2 551 525 | 3/1985 |

* cited by examiner

Primary Examiner—Stephen M. Hepperle
(74) Attorney, Agent, or Firm—Smith, Gambrell & Russell, LLP

(57) ABSTRACT

The invention relates to a pressure control valve (1) comprising a control piston (3) which is able to slide in a valve hole (4). Under the effect of an energy accumulator (5) said piston in one direction of displacement connects a pump connection (23) with a consumer connection (24) and in the other direction of displacement connects the consumer connection (24) with a tank connection (21) such that the pump connection (23) is closed off. The aim of the invention is to provide a pressure control valve which functions reliably and in a stable manner even in case of elevated control dynamics. To this end, independently of the direction of displacement of the control piston (3) a minimum volume flow present between the piston and the valve hole (4) dampens the displacement of the control piston (3).

12 Claims, 1 Drawing Sheet

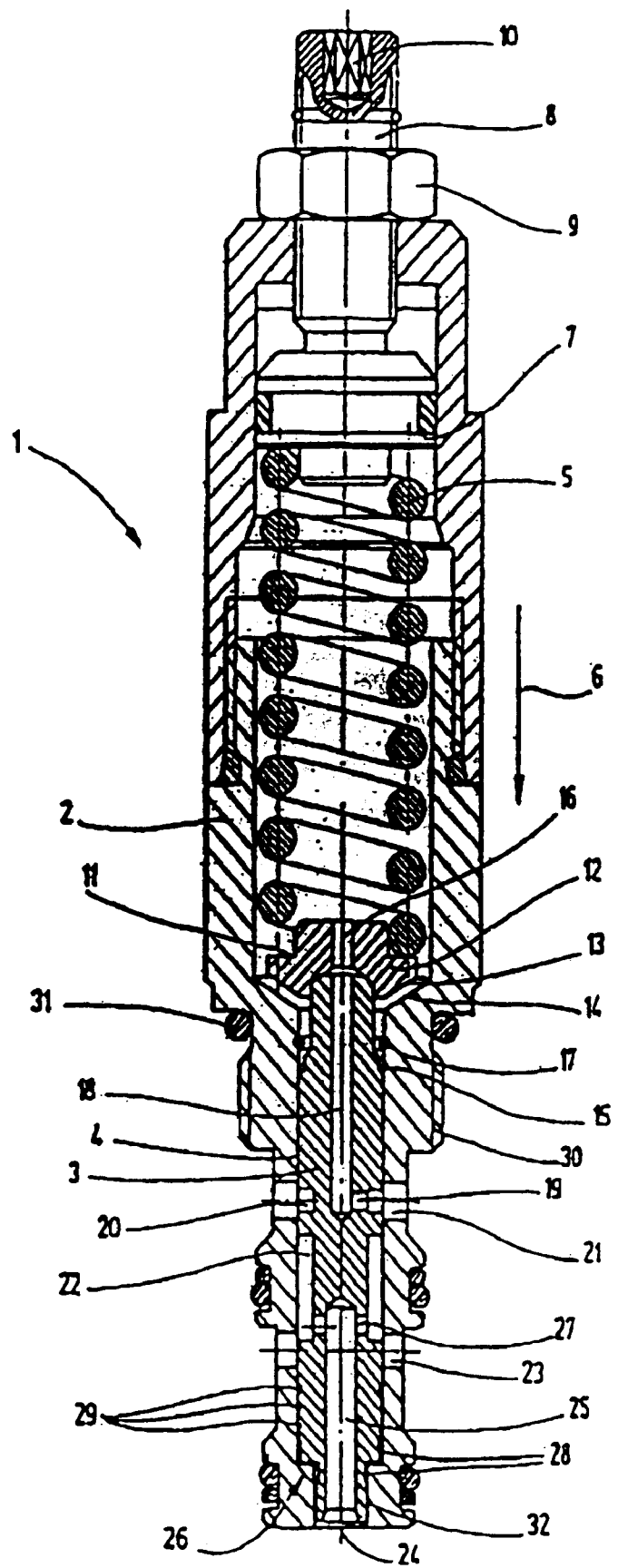

PRESSURE CONTROL VALVE WITH HYDRODYNAMIC DAMPING

The invention, in accordance with the preamble of Claim 1, pertains to a pressure control valve with a control piston that can be displaced in a valve bore.

BACKGROUND OF THE INVENTION

The control piston of pressure control valves according to the state of the art is held in its normal position by an energy storage device. In one direction of travel, the pressure control valve connects a pump connection to a load connection. In the other direction of travel, the pressure control valve connects the load connection to a tank connection while disconnecting the pump connection. If the pressure at the load connection exceeds a be predetermined set point, the control piston travels against the force of the energy storage device and thus reduces the flow cross section between the pump connection and the load connection until the pressure at the load connection corresponds to the predetermined set point. If the set point is exceeded, the control piston travels against the force of the energy storage device to such an extent that pressure is released from the load connection to the tank connection.

In known pressure control valves, it is disadvantageous if control instabilities occur during rapid control processes, due to the spring-mass system, in particular, within the region of the control piston.

DE 35 05 377 C2 discloses a pressure control valve in which a control piston that can be moved by an electromagnet is displaceably arranged in an axially closed distributor housing. DE-OS 27 00 058 discloses a flow control valve in which a plunger piston, which can be axially displaced in a bore in the control piston and forms an annular gap with the bore, forms a damping device for the movement of the control piston.

The invention is based on the objective of making available a pressure control valve that also guarantees a reliable and stable operation over a wide control range. The design costs for preventing the instabilities should be held to a minimum, and the individual components of the pressure control valve should be low in number.

The objective is realized with the pressure control valve disclosed in Claim 1. Special embodiments of the invention are disclosed in the subordinate claims.

BRIEF SUMMARY OF THE INVENTION

According to Claim 1, the invention is based on a pressure control valve with a control piston that can be displaced in a valve bore; in one travel direction, said control piston connects a pump connection to a load connection under the effect of an energy storage device In the other travel direction, it connects the load connection to a tank connection while disconnecting the pump connection. The invention is characterized by the fact that a volume flow between the control piston and the valve bore, in particular, a volume flow in an annular gap formed by the control piston and the valve bore, causes a damping of the excursion movement of the control piston independently of the direction of travel of travel. The volume flow is preferably small, specifically, it is only as large as is required for the damping.

The advantages of the invention are that the damping is realized with an annular gap formed directly in the pressure medium channel, and that the damping volume is linked to the pressure medium volume flow. In addition, the arrangement has no dead volume with respect to the damping effect. These advantages become particularly evident in directly controlled pressure controllers, in which the damping options are basically limited.

The damping of the control piston by means of the volume flow and the respective pressure build-up associated therewith also provides the advantage that the damping effect is a function of the speed of the control piston and is due to the portion of the frictional forces caused by the entrained flow or displacement flow, and that the damping effect is a function of the differential pressure between the pump connection and the load connection and is due to the portion of the frictional force which is caused by the leakage flow from the pump connection to the load connection. This results in a particularly advantageous damping and control behavior of the pressure control valve. The portions of the leakage flow and the entrained flow or displacement flow can be adjusted in a particularly simple and advantageous fashion by correspondingly adapting the geometrical shape of the pressure control valve, in particular, the control piston. Since the frictional forces act on the outer surface of the preferably cylindrical control piston, a particularly uniform force effect and consequently a particularly superior control and damping behavior of the pressure control valve can be achieved.

The special embodiment of the invention according to Claim 2 provides the advantage that the direction and the amount of the entrained flow can be predetermined. In this case in particular, it can be predetermined that the entrained flow is introduced into the pressure control valve at the load connection which is usually subjected to a lower pressure than the pump connection.

The special embodiments of the invention according to Claims 3 and 4 provide the advantage that a hollow cylindrical volume, into or from which the entrained flow or displacement flow which passes through the larger annular gap at the load connection can be introduced or discharged, respectively becomes larger or smaller due to the step formed between the two sections of the control piston which have different diameters during the axial travel of the control piston between the step of the control piston and the corresponding step of the valve bore. Due to the geometrical design of the steps as well as the annular gap, the damping characteristic of the pressure control valve can be easily and precisely adjusted as well as adapted to different situations. For example, the control and damping characteristic of a pressure control valve can be changed by exchanging the control piston.

The special embodiment of the invention according to Claim 6 provides the advantage that coil springs represent reliable and inexpensive energy storage devices which have a long service life, and that coil springs are available with nearly any desired dimensions. As an alternative to coil springs, other mechanical energy storage devices, e.g., a leaf spring, an elastic element, or pneumatic or hydraulic pressure reservoirs may be considered for this purpose.

The special embodiment of the invention according to Claim 7 provides the advantage that a reliable connection between the load connection and the pump connection and between the load connection and the tank connection can be produced with simple and inexpensive structural means.

The special embodiment of the invention according to Claim 9 provides the advantage that a clear structural separation between the load connection, the pump connection and the tank connection is ensured. In this case, the pump connection and the tank connection may be realized radially or annularly.

The special embodiment of the invention according to Claim 10 provides the advantage that the control pressure or the set point can also be changed after the manufacture of the pressure control valve, even after the pressure control valve is installed into a larger system.

The special embodiment of the invention according to Claim 11 provides the advantage that the pressure control valve can also be easily installed and replaced in larger pressure control systems modularly, due to the use of the pressure control valves in the form of screw-type cartridges.

Additional advantages, characteristics and details of the invention are disclosed in the subordinate claims as well as the following description, in which one embodiment of the invention is described in detail with reference to the figure. In this respect, the characteristics disclosed in the claims and in the description may be essential for the invention individually or in arbitrary combination.

BRIEF DESCRIPTION OF THE DRAWING

The FIGURE shows a section through a pressure control valve according to the invention.

DETAILED DESCRIPTION OF THE INVENTION

The FIGURE shows a section through a pressure control valve 1 according to the invention which contains a valve body 2 and a control piston 3. The control piston 3 is axially guided in the valve body 2 in a valve bore 4 and pressed in the direction of the arrow 6 by the coil spring 5. The coil spring 5 is supported on the upper end by a first disk 7, the horizontal position of which can be adjusted by means of a threaded bolt 8 that is screwed into the valve body 2. This adjustment is secured by means of the lock nut 9. The adjustment is preferably realized by utilizing a hexagonal socket 10 that is formed in the outer end of the bolt 8.

On the other end, the coil spring 5 is supported on the shoulder 11 of the second disk 12 that accommodates the control piston 3 in a central bore. The control piston 3 has a reduced diameter on its end that faces the second disk 12 and thus forms an annular shoulder 15 that represents a mechanical limit stop for the travel of the control piston 3 opposite to the direction of the arrow 6 in cooperation with a safety ring 17 that is inserted into the valve bore 4.

The control piston 3 contains an oblong first blind hole bore 18 within this region which allows a connection to the tank connection 21 by means of a first taphole 19 and a circumferential groove 20. This connection is extended in the form of a central bore 16 in the second disk 12 and makes it possible to fill the interior of the pressure control valve 1 from the tank connection 21 and evacuate it into the aforementioned tank connection.

Over its additional axial progression, the control piston 3 contains an axially expanded annular groove 22 that connects the radial tank connection 21 to the radial pump connection 23 if the control piston 3 is situated in the corresponding axial position. In addition, the control piston 3 contains a second blind hole bore 25 that is directed toward the axial load connection 24 and connected to the axially expanded annular groove of 22 by means of second taphole 27. Consequently, the second blind hole bore produces a connection between the radial pump connection 23 and the axial load connection 24 if the control piston 3 is situated in the corresponding position.

The control piston 3 has a smaller diameter within the region of the load connection 24. At the transition from the smaller diameter to the larger diameter which is formed by a step 26, the section of the control piston 3 with the smaller diameter as well as the section of the control piston with the larger diameter contain a region with a reduced diameter such that a hollow cylindrical volume 28 is formed. Over its additional progression between the load connection 24 and the pump connection 23, the control piston 3 contains three annular grooves 29 that are realized in the form of relief grooves.

The section of the control piston 3 which is situated at the load connection 24 is adapted to the valve body 2 in the section 32 in such a way that an annular gap with a play between 40 µm and 60 µm is formed. Within the region of the pump connection 23, the annular piston 3 forms an annular gap between 8 µm and 13 µm with respect to the valve bore 4.

The pressure control valve 1 can be screwed into an existing pressure control system in the form of a screw-type cartridge with its external threads 30. In this case, the seal 31 which adjoins a (not-shown) shoulder of the pressure control system acts as a seal between the pressure control valve and the pressure control system.

If the pressure at the load connection 24 exceeds the predetermined set point, the control piston 3 moves opposite to the direction of the arrow 6 and against the force of the coil spring 5 due to the excess pressure. During this process, a volume of oil is drawn into the hollow cylindrical volume between the control piston 3 and the valve body 2 within the region of the step 26, i.e., through the annular gap formed due to the larger amount of play between the control piston 3 and the valve body 2 at the load connection.

If the pressure at the load connection 24 falls below the predetermined set point, the control piston 3 moves in the direction of the arrow 6 in accordance with the force of the coil spring 5 exerted upon the control piston. Here, the hollow cylindrical volume formed within the region of the step 26 becomes smaller and the enclosed medium must be displaced to the load connection 24 through the defined annular gap in the direction of the arrow 6.

This displacement volume flow $Q_{displacement}$ can be determined in accordance with the following equation:

$$Q_{Displacement} = \frac{\pi}{4} \times (d_a^2 - d_i^2) \times v_{Piston}$$

where $\pi$ represents the circle factor, $d_a$ represents the inside diameter of the valve bore 4 in the section of the control piston 3 with the larger diameter, $d_i$ representing the outside diameter of the control piston 3 in the section with the smaller diameter, and $\mu_{piston}$ represents the speed of the control piston 3.

The pressure build-up in the space that becomes smaller can be determined by inserting this displacement volume flow $Q_{displacement}$ through the annular gap into the following equation $$p_{Pressure\ build-up} = \frac{Q_{Displacement} \times 12 \times \eta \times I}{\pi \times d_m \times h^3}$$

where $\eta$ represents the viscosity of the displaced medium, I represents the gap length, $d_m$ represents the average gap diameter, and h represents the gap, e.g., 40 µm–60 µm.

Relative to the effective pressure surface, it is possible to determine a force $F_{pressure\ build-up}$ that is directed opposite the force that causes piston travel and thus damps the movement of the control piston 3:

$$F_{build-up}^{Pressure} = p_{build-up}^{Pressure} \times \frac{\pi}{4} \times (d_a^2 - d_i^2)$$

What is claimed is:

1. A pressure control valve comprising a control piston that can be displaced in a valve bore, wherein said control piston connects a pump connection to a load connection in one direction of travel under the effect of an energy storage device, and connects the load connection to a tank connection while disconnecting the pump connection in the other direction of travel, and further wherein the volume flow between the control piston and the valve bore causes a damping of the movement of the control piston independently of the direction of travel of the control piston.

2. The pressure control valve according to claim 1, wherein the control piston forms a larger annular gap with the valve bore at the load connection than at the pump connection.

3. The pressure control valve according to claim 1, wherein the control piston contains two axial sections with two different piston diameters that form an annular step between the pump connection and the load connection, with the control piston being axially displaceable in the valve bore that contains a corresponding annular step.

4. The pressure control valve according to claim 3, wherein the volume flow contains an entrained flow or displacement flow portion that is respectively introduced into or discharged from the hollow cylindrical volume that becomes larger or smaller due to the axial travel of the control piston between the step of the control piston and the step of the valve bore through the larger annular gap at the load connection.

5. The pressure control valve according to claim 1, wherein the control piston has a smaller diameter at the load connection than at the pump connection.

6. The pressure control valve according to claim 1, wherein the energy storage device consists of a mechanical energy storage device.

7. The pressure control valve according to claim 1, wherein the control piston contains a central axial bore for producing the connection between the load connection and the pump connection, and the control piston contains a third section of reduced diameter that serves for producing the connection between the load connection and the tank connection and forms a hollow cylindrical channel with the valve bore.

8. The pressure control valve according to claim 1, wherein the control piston contains annular grooves between the pump connection and the load connection.

9. The pressure control valve according to claim 1, wherein the load connection is arranged axially on the pressure control valve relative to the longitudinal axis of the control piston, and the pump connection and the tank connection are arranged radially on the pressure control valve relative to the longitudinal axis of the control piston.

10. The pressure control valve according to claim 1, wherein the pressure to be controlled can be adjusted from outside the pressure control valve by adjusting means that act upon energy storage device.

11. The pressure control valve according to claim 1, wherein the pressure control valve contains external threads and can be screwed into a pressure control system in the form of a screw-type cartridge.

12. The pressure control valve according to claim 6, wherein the energy storage device consists of a coil spring.

* * * * *